March 31, 1953    J. D. KELLY    2,633,148
TIRE PRESSURE RELIEF VALVE
Filed May 12, 1947    2 SHEETS—SHEET 1
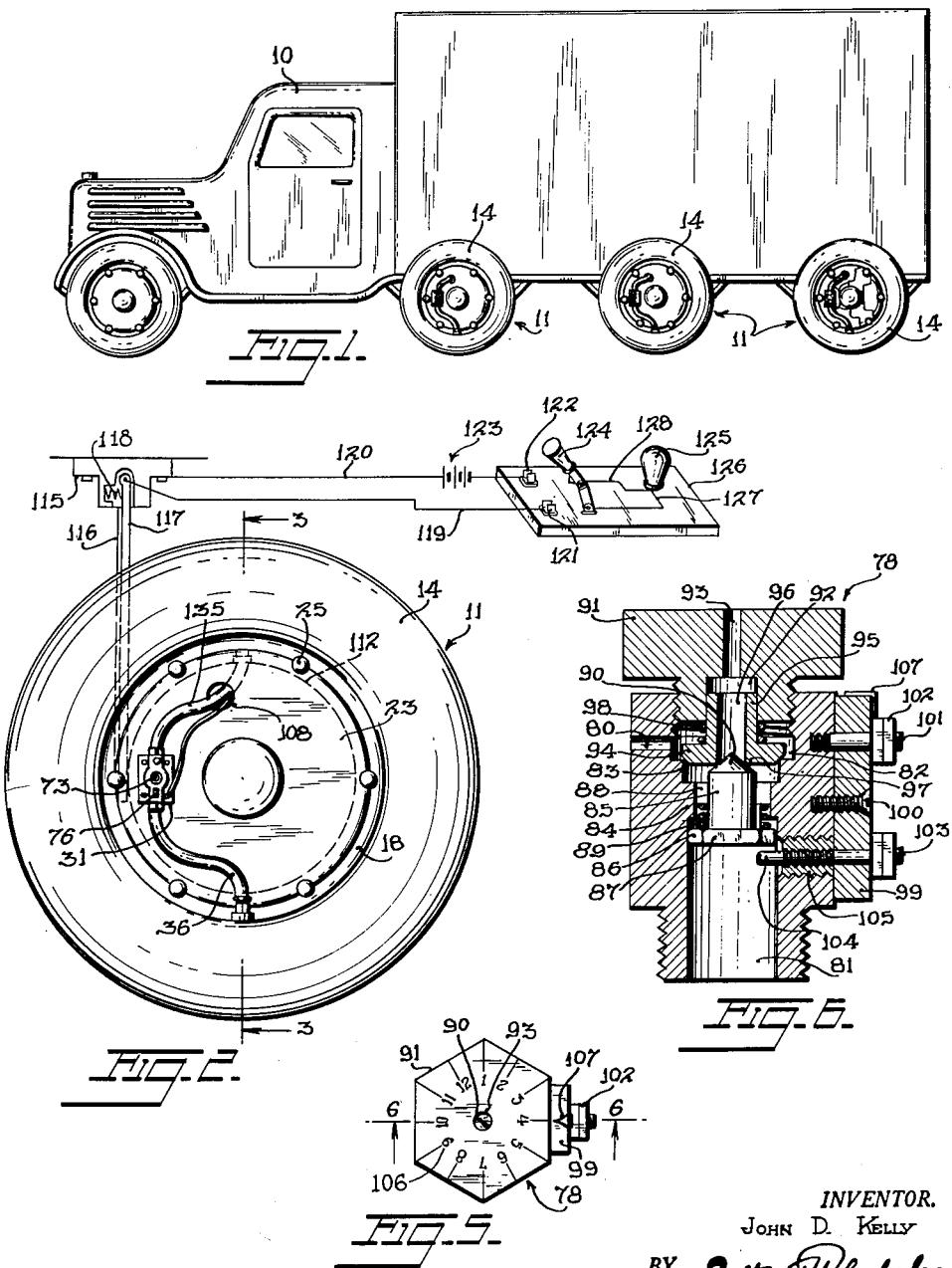
INVENTOR.
JOHN D. KELLY
BY
ATTORNEY March 31, 1953      J. D. KELLY      2,633,148
TIRE PRESSURE RELIEF VALVE
Filed May 12, 1947      2 SHEETS—SHEET 2
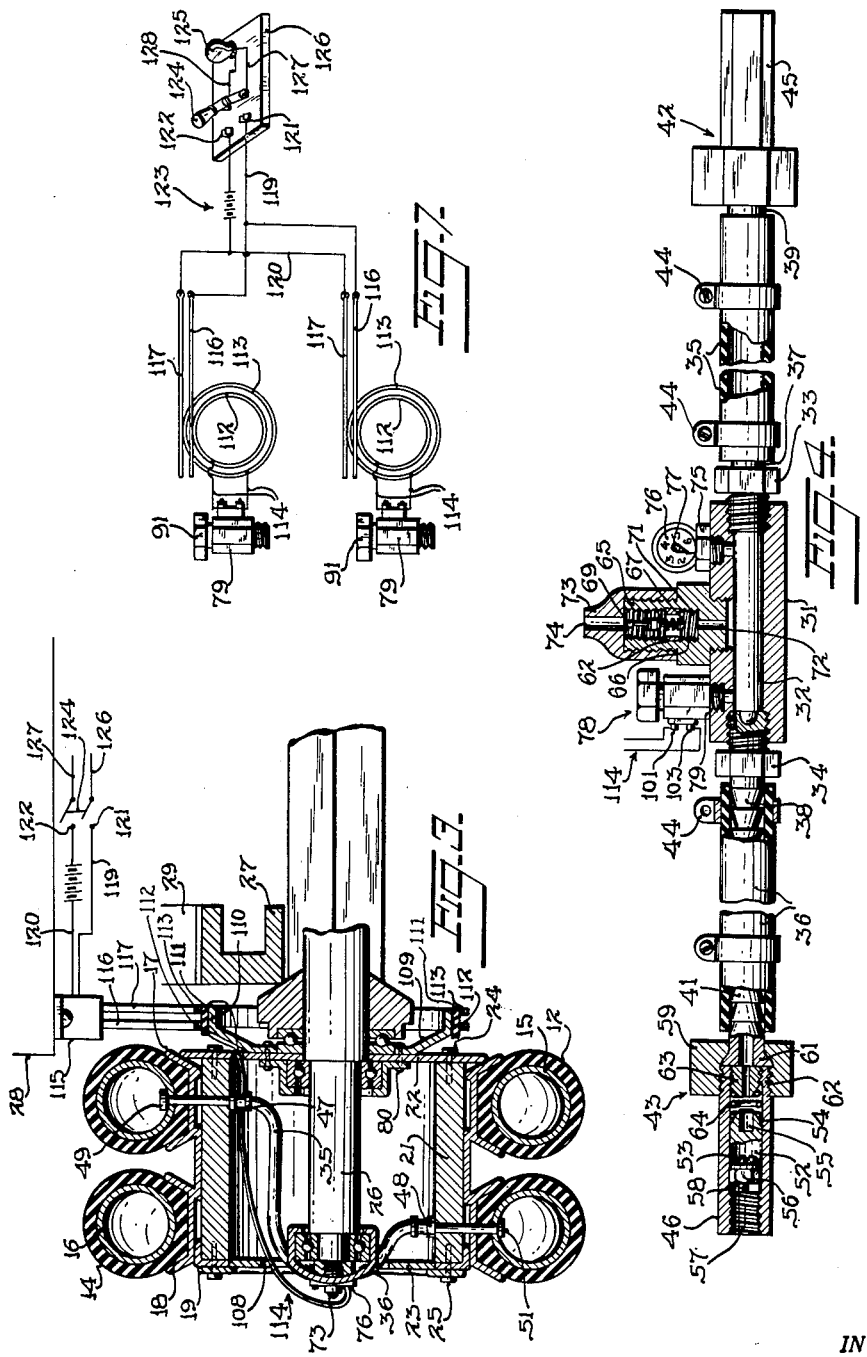
INVENTOR.
JOHN D. KELLY Patented Mar. 31, 1953

2,633,148

UNITED STATES PATENT OFFICE 2,633,148

TIRE PRESSURE RELIEF VALVE

John D. Kelly, New York, N. Y., assignor of one-half to Paul Johneas, Bellerose, N. Y.

Application May 12, 1947, Serial No. 747,561

2 Claims. (Cl. 137—513)

This invention relates to tire inflation safety means for automobiles.

It is an object of the present invention to provide a relief valve for attachment to the inlet stem of a tire for allowing excess air pressure within the tire to vent itself into the air.

It is another object of the present invention to provide a relief valve for attachment to the inlet stem of a tire or the like which includes valve control means and spring means, said valve control means being movable by air pressure within the tire which exceeds pressures exerted by the spring means.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevation of an eight wheel, fourteen or sixteen tire heavy duty truck.

Fig. 2 is an enlarged side elevation of one of the dual rear wheels seen in Fig. 1, showing a form of signalling means associated with this wheel.

Fig. 3 is a vertical section of the wheel taken on line 3—3 in Fig. 2.

Fig. 4 is an enlarged side elevation of the main elements of the tire inflation equalizing means, showing some of the parts in section to disclose structural details and relations.

Fig. 5 is a plan view of the automatic gauge and relief valve per se.

Fig. 6 is an enlarged vertical sectional view taken on line 6—6 of Fig. 5.

Fig. 7 is a schematic wiring diagram of the parts of the electrical system for causing a signal to be operated when tire deflation occurs in the tires on any one of a plurality of wheels.

Throughout the views, the same reference numerals indicate the same or like parts.

When a heavy truck provided with double wheels or at least with wheels having dual tires is in active use, it is not only desirable but necessary for the truck driver to know that all the tires are properly inflated in order to ensure safe driving. If even one tire is partly deflated, traction with the road is reduced and unreliable and tends to impart a side draft to the vehicle, making it more difficult to steer and otherwise control the truck. This obviously introduces an element of danger. When such tire deflation exists or occurs, it is essential that the driver is apprised of this dangerous condition at once, so that he can take immediate steps to bring the offending tire or tires up to standard degree of inflation.

As time is also a factor when driving such a truck, possibly long distance with valuable merchandise, it is likewise important that the deflated tire or tires are quickly located and restored to fully inflated condition, so that the truck may proceed on its way without delay.

In order to attain these ends, and particularly with the foregoing objects in view, the invention includes certain novel parts and features in combination as will now be set forth in due order and detail.

Hence, in the practice of my invention, and referring now again to the drawing, the truck 10 of Fig. 1 has a plurality of main body wheels generally indicated at 11, 11, etc., which are preferably dual tire wheels, one of which is shown in enlarged elevation in Fig. 2. As illustrated in Fig. 3 in further detail, each such wheel may be of the so-called disc type and equipped with the dual tires 12 and 14, with inner tubes 15 and 16, their mounting rims 17 and 18 and the rim mounting lugs 19, all as shown in more or less conventional manner.

As the wheel 11 illustrated is one of the rear wheels of the truck and of the mentioned disc type, it includes an annulus 21 of rather considerable width which, with side plates or discs 22 and 23 bolted thereto at 24, 25 for example, provides a hollow drum structure forming the main body of the wheel. It is evident that any other form of wheel accommodating the dual tires might serve for the present purpose, and hence further attention to the specific structure of the wheel is superfluous.

However, wheel 11 rotates on an axle 26 extending beneath truck frame 27 supporting the truck body 28 and cushioned by springs, one of which is shown diagrammatically at 29 in Fig. 3. On the two plates or discs 22, 23 there are mounted certain portions of the tire inflation safety and equalizing system mainly embodying my invention. The latter includes an air pressure distribution system consisting of a mechanical arrangement associated with an electric signal circuit. Upon plate or disc 23 is fixed a distributing valve casing 31 having the internal passage or chamber 32 (Fig. 4) to both ends of which are rigidly connected two hose connectors 33, 34 with a pair of lengths of rubber hose 35, 36 attached thereto upon the nipple ends 37 and 38.

The outer ends of both hose members are connected in similar fashion to the end nipples 39 and 41 of a pair of tire connectors generally indicated at 42 and 43, the ends of the hose members being firmly retained upon the nipples in each case by the clamping straps 44, in well known manner. The tire connectors include internally threaded end nipples 45 and 46 adapted to be screwed into the tire nipples 47 and 48 (Fig. 3) of tubes 49 and 51 communicating directly with the interiors of the inner tubes 15 and 16 within the tires 12 and 14. Each of the tire connectors 42, 43 contains a typical one way valve including an externally knurled valve member 52 having an outer scalloped end portion 53 and a conical inner end 54 provided with a rubber plug 55.

The outer scalloped end 53 of valve member 52 is limited in movement by a stop member 56 screwed into the threaded end 57 of end nipple 46 and pierced by holes 58 to allow air under pressure to pass the knurled sides of valve member 52 and its scalloped end through the mentioned holes in to the tire when the latter is being inflated.

The tire connectors in each case include a nut 59 which retains the flanges 61 of the nipples 39 and 41, only the flange 61 of the nipple 41 is shown in Figure 4, in contact with the inner threaded ends 62 of tire connector nipples 45 and 46, while within the threaded end 62 of each of the tire connector nipples 45 and 46 there is screwed a valve seat member 63 adapted to be abutted by the rubber plug 55 of the respective valve member 52, but normally separated therefrom by a spring 64 engaging against said valve member, on the one hand and the seat member 63, on the other hand.

It is evident that if compressed air travels from the distributing valve housing 31 through hose 36 and nipple 41, it will not affect the position of valve member 52 but will simply pass, as already mentioned, through tire connector 46 into inner tube 15 within tire 12, for example.

The distributing valve casing 31 is provided with an inlet valve body 65 screwed into the top of the casing and having a valve seat 66 for a one-way valve 67 urged, by a spring 68 located on a stem 69 of the valve 67, against the seat 66 formed in the valve chamber 71 which communicates with distributing valve chamber 32 through passage 72. Upon the mentioned inlet valve body 65 is screwed a hollow nipple member 73 having an upper passage or bore 74 venting the upper portion of the valve interior to the atmosphere. When compressed air is introduced past the inlet valve just mentioned, it opens downward and allows the air to proceed into the distributing valve chamber 32 to immediately be distributed to both hose members 35 and 36 and through end nipples 45, 46 simultaneously into the two tires.

In order to have a visual index of the pressure prevailing in the system thus far described, a pressure gauge 75 is screwed into the top of casing 31 so as to communicate with the interior passage or chamber 32 thereof, said gauge being provided with a dial 76 and a movable index hand 77. On the other hand, a further special valve, generally indicated at 78 has a valve casing 79 also screwed into the top of the distributing valve casing. As best seen in Fig. 6, valve casing 79 is interiorly formed with a lower valve chamber 81 communicating directly below with distributing chamber 32 already referred to, and an upper valve chamber 82 having a valve seat 83 and an inwardly projecting flange 84 between the two chambers, forming a guide for a slidable valve member 85 which in turn is provided with a flange 86 slidable in valve chamber 81. Flange 86 has flat clearance portions 87 for passing compressed air toward the flange 84, the latter being serrated or fluted so as to provide air channels 88 to pass the air up towards valve seat 83.

A spring 89 of predetermined compression resistance is mounted on valve member 85 between the flange 84 and the flange 86. The upper valve chamber 82 is threaded in the upper end thereof, into which a regulating cap 91 is screwed, having a central bore 92 communicating with the outside through a smaller bore 93. In valve chamber 82 is located a loosely fitting relief valve member 94 having a hollow shank 95 projecting slidably up into the bore 92 in cap 91, while a central valve bore 96 forms at the bottom a seat 97 for the conical end 90 of valve member 85, the relief valve member 94 itself normally engages against the previously described valve seat 83 in casing 79. Upon shank 95 is mounted a relatively strong compression spring 98 which operates between valve member 94 and the lower end of regulating cap 91 for the purpose of loading the valve member sufficiently to prevent the same from leaving valve seat 83 under all ordinary tire pressures.

When excess pressure occurs or exists in the system, it is communicated from the tires through the hose members to the distributing valve chamber 32 and thence to valve chamber 81, in which the air pressure will act on both valve members 85 and 94 as a unit to compress spring 98 and cause the larger relief valve 94 to move off valve seat 83. Both valves will continue moving until flange 86 strikes the flange 84, stopping valve member 85 while valve member 94 continues further and separates from valve member 85 leaving valve seat 97 open to allow the excess air to escape through bore 96 of the valve and the smaller bore 93 of cap 91. In order to make certain that excess air will escape from valve bore or chamber 81 when relief valve 94 is displaced from contact with seat 83, the valve is intentionally a loose fit in chamber 82 and the latter communicates with the outside through a side vent 80 at least partly uncovered by the relief valve when raised, allowing air to flow past this relief valve 94 and out through said vent even before valve member 85 is stopped from following said relief valve 94 by flange or partition 84.

The mentioned regulating cap 91 is adjustable by partly unscrewing the same in order to partially relieve its spring 98 and thus lower the pressure required to operate the relief valve and release the excess air pressure, while turning the cap in the other direction obviously tightens the spring by compressing the same so as to require a greater pressure to operate said relief valve. In any case, the excess pressure is quickly released so that valve member 94 is returned by spring 98 against its seat 83 and said valve will meanwhile also make contact with the upper end of valve 85 and move the latter valve along with it to closed position.

Upon one side of the valve casing 79 is fixed a block 99 of non-conducting material such as fibre, ebonite, porcelain or any suitable plastic, being held in place by screws 100 and 101, the latter being longer than the other so as to provide a grounded binded post with wire anchoring nuts 102. Another binding post 103 also projects from said block with similar nuts 102 and also extends inwardly through the casing wall and terminates in valve chamber 81 in a contact portion 104 disposed in the path of valve member 85, while an insulating sleeve 105 isolates the binding post 103 from the valve casing. For the purpose of accurately governing the pressure at which the high pressure relief valve 94 will operate cap 91 has the upper surface thereof divided into a series of dial divisions or indices as indicated at 106. A fixed index member 107 is located on the top of the block 99 adjacent to cap 91 so that index member will by its location point to and indicate the number of pounds of pressure forming the maximum allowed for the tires, according to the setting of said cap, and above which pressure said valve member 94 will be shifted by the excess air pressure emanating from valve chamber 81. The spring 89 on low pressure valve member 85 is selected to shift this valve from its seat 97 in valve member 94 below the minimum pressure required for the tires.

Returning to wheel 11, one hose member 36 is located wholly on the near side of disc 23 of this wheel, communicating with the tire 14 by its fixture 47, while the other hose member passes through an aperture 108 in said disc to reach the tire fixture 48 of the other tire 12. Upon the inner disc 22 is secured a dished disk member 109 which could also be a ring shaped frame, by means of screws or rivets 80, and is formed with a side flange 110 carrying an insulating collar 111 upon which are mounted a pair of contact rings 112, 113 connected by conductors 114 to binding posts 101, 103, on valve casing 79.

Upon an appropriate portion of the truck body 28 is mounted a supporting block 115 to which are independently connected a pair of swingable contact brushes 116, 117 urged by spring 118 (one shown) into wiping contact with contact rings 112, 113 which rotate with the wheel 11. A pair of further conductors 119, 120 are connected to the brushes 116, 117 and to switch contacts 121, 122, with a battery or other sources of current 123 connected in the conductor 120. A switch 124 is adapted to be engaged with its contacts 121, 122 at will, and communicates with a signal lamp 125 through leads 127, 128 on the dash board 126 of the truck in view of the driver of the latter. A bell or buzzer could also be used instead of the lamp, if so desired. The arrangement is such, that when the air pressure in the tire falls below the predetermined pressure, spring 89 in valve casing 71 overcomes the existing pressure and withdraws valve member 85 into active contact with contact portion 104 upon the inner end of binding post 103. This closes the circuit including valve casing 79, valve member 85, also the binding posts and conductors 114, contact rings 112—113, brushes 116—117, leads 119—120, switch contacts 121—122, battery 123, switch 124, lamp 125 and its leads 127 and 128.

The attention of the driver being thus called to the lamp by the lighting thereof, he will upon inspection of the several wheels of the truck immediately notice which wheel shows the offending low pressure on its dial 76 and will thus be in immediate position to apply an air hose to valve nipple 73, and by the compressed air injected through its passage 74 again raise the pressure noted on the dial by index hand 77 until the latter shows the desired standard pressure. When the air hose nozzle is removed from nipple 73, the acquired air pressure attempting to escape past valve member 85 will instantly close it by pushing the same forward into closing relation of its conical end 90 with seat 97 in valve member 94 and the truck is then ready to proceed.

The valve mechanism associated with distributing valve casing 31 is naturally susceptible of modification in several features and details without departing from the spirit of my invention. For example, the several valve casings could be made into a single integral casing structure. Also, the conical end 90 of valve member 85 could be altered to present a short cylindrical portion slidably fitting into bore 96 of relief valve member 94 so that valve member 85 could move a short distance independently of valve 94 before seat 97 would be clear of said cylindrical portion for the passage of air. In fact, the entire valve could be replaced by another structure serving its purposes if so desired.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A relief valve for attachment to the inlet stem of a tire or the like, comprising a one-piece valve casing adapted to be attached at one end to the inlet stem and having an internal inwardly directed flange separating the interior thereof into an inner chamber for communicating with the interior of the stem and an outer chamber open to the adjacent end of said casing, a regulating cap threaded into the outer end of said outer chamber and having a central bore communicating said outer chamber with the atmosphere, a valve seat within said outer chamber, a relief valve member within said outer chamber having a tubular shank slidably engaged in the bore of said cap and a flange facing said valve seat, a spring operating between said cap and said flange of said valve member seating that flange on said valve seat, a second valve member having a flange provided with an air bypass slidable within said inner chamber and a cylindrical portion extended slidably through said inwardly directed flange, said cylindrical portion having a conical end facing said relief valve member concentric with its tubular shank, said inwardly directed flange having air channels surrounding said cylindrical portion of said second valve member, a spring operating between said inwardly directed flange and the flange of said second valve member holding said second valve member in a position against the action of air pressure within said inner chamber in which its conical end closes the inner end of said tubular shank, and a shoulder within said inner chamber between said inwardly directed flange and said flange of said second valve member to be engaged by said flange of said second valve member and limit movement of said second valve member toward said inwardly directed flange when said valve members are moved by air pressure within said inner chamber which exceeds pressures exerted by said springs.

2. A relief valve for attachment to the inlet stem of a tire or the like, comprising a one-piece valve casing adapted to be attached at one end to the inlet stem and having internal inwardly directed flange separating the interior thereof into an inner chamber for communicating with the interior of the stem and an outer chamber open to the adjacent end of said casing, a regulating cap threaded into the outer end of said outer chamber and having a central bore communicating said outer chamber with the atmosphere, a valve seat within said outer chamber, a relief valve member within said outer chamber having a tubular shank slidably engaged in the bore of said cap and a flange facing said valve seat, a spring operating between said cap and said flange of said valve member seating that flange on said valve seat, a second valve member having a flange provided with an air bypass slidable within said inner chamber and a cylindrical portion extended slidably through said inwardly directed flange, said cylindrical portion having a conical end facing said relief valve member concentric with its tubular shank, said inwardly directed flange having air channels surrounding said cylindrical portion of said second valve member, a spring operating between said inwardly directed flange and the flange of said second valve member holding said second valve member in a position against the action of air pressure within said inner chamber in which its conical end closes the inner end of said tubular shank, and a shoulder within said inner chamber between said inwardly directed flange and said flange of said second valve member to be engaged by said flange of said second valve member and limit movement of said second valve member toward said inwardly directed flange when said valve members are moved by air pressure within said inner chamber which exceeds pressures exerted by said springs, said flange of said relief valve member having a diameter less than the internal diameter of said outer chamber, said casing having a vent between said valve seat and the interior end of said cap communicating the interior of said outer chamber with the atmosphere.

JOHN D. KELLY.

REFERENCES CITED

The following references are of record in the file of this patent:

UNITED STATES PATENTS

| Number | Name | Date |
| --- | --- | --- |
| 960,246 | Asmore | June 7, 1910 |
| 984,453 | Terpening | Feb. 14, 1911 |
| 1,082,182 | Van Winkle | Dec. 23, 1913 |
| 1,359,262 | McKee | Nov. 16, 1920 |
| 1,837,970 | Jones | Dec. 22, 1931 |
| 1,870,484 | Basta | Aug. 9, 1932 |
| 2,056,064 | Fenton | Sept. 29, 1936 |
| 2,251,713 | Meiser | Aug. 5, 1941 |
| 2,260,246 | Woodruff et al. | Oct. 21, 1941 |
| 2,314,965 | Alava y Sautu | Mar. 30, 1943 |

FOREIGN PATENTS

| Number | Country | Date |
| --- | --- | --- |
| 274,323 | Italy | May 17, 1930 |